United States Patent [19]

Orban

[11] 4,314,750

[45] Feb. 9, 1982

[54] TACTILE INDICATION AND CONTROL SYSTEM

[75] Inventor: John M. Orban, Santa Monica, Calif.

[73] Assignee: Vivitar Corporation, Santa Monica, Calif.

[21] Appl. No.: 224,076

[22] Filed: Jan. 12, 1981

[51] Int. Cl.³ .......................... G03B 3/00; G03B 9/02; G03B 17/18
[52] U.S. Cl. .................................. 354/198; 352/139; 354/273; 354/289; 355/55; 358/227
[58] Field of Search ................ 354/25, 40, 60 E, 198, 354/273, 289; 352/139; 355/55, 59; 358/227

[56] References Cited

U.S. PATENT DOCUMENTS 3,101,658  8/1963  Hayes .................................. 354/289

*Primary Examiner*—Michael L. Gellner
*Attorney, Agent, or Firm*—Lyon & Lyon

[57] ABSTRACT

There is disclosed herein a method and an apparatus which provide a tactile indication of the occurrence of a particular event, such as during the operation of a photographic camera, to provide an indication to the operator that a proper exposure condition, like proper focus, aperture or shutter speed, has occurred. For example, and as particularly shown and described herein, a photographic camera includes an autofocus sensing system which senses when a focusing device, such as the focusing ring, of the camera lens has been adjusted for proper focus. When this focus event occurs, an electromagnet operates a brake to prevent the lens focusing device from being turned or operated further, at least momentarily, to thereby provide to the camera operator a tactile indication that the proper focus has been achieved. The electromagnet can be associated with the camera body to engage the focusing device of the lens, or it can be in or within the lens assembly. The concepts of the invention also are useful for setting the aperture or shutter speed of a camera in response to the brightness level of the scene being photographed (along with the usual input to the camera system of film sensitivity and shutter speed or aperture). In this latter case, the brake momentarily stops the movement of the aperture or shutter speed adjustment ring. The present invention also is useful for various forms of cameras and the like, such as still, movie, photographic, video, and so forth, as well as photographic enlargers.

14 Claims, 4 Drawing Figures

TACTILE INDICATION AND CONTROL SYSTEM

BACKGROUND OF THE INVENTION

1. Field of the Invention

The present invention relates to display or indicator and control systems, and more particularly to a tactile indicator system for indicating to an operator the achievement of a desired variable exposure condition, such as the proper focus, of a camera or other photographic device. The method and apparatus of the present invention have particular application to various forms of cameras, such as film and video, as well as photographic enlargers, for providing a tactile indication to the camera operator that a proper focus condition or other exposure condition has been achieved. The term camera is used herein and in the claims to include various forms of imaging systems such as film cameras, video cameras, enlargers and the like.

In order to facilitate an understanding of the present invention and applications thereof, the same will be discussed in the context of a photographic film camera for providing a tactile indication that a desired or proper focus condition has been achieved. Other applications of the present concepts will be described.

2. Description of the Prior Art

Various forms of photographic cameras are well known. The more sophisticated cameras include an objective lens system which can be focused on the subject to provide the best photographic image. Typical examples of such cameras are the rangefinder type and the single-lens reflex type. In each instance, the camera operator looks into a viewfinder and adjusts a focusing ring on the lens of the camera to achieve a particular focus condition. The best focus usually is indicated by the coming together of split images. As is apparent to photographers, the focusing operation distracts from composing the picture. Also it should be noted that many cameras having a light metering system include some form of indicator in the viewfinder to indicate when a proper f/stop or shutter speed adjustment has been made in order to achieve a proper exposure. The necessity of viewing these indications likewise is distracting.

In recent years cameras have become more automated. In addition to automatic aperture and/or shutter speed control systems, there now exist on the market several forms of 35 mm cameras which include an autofocus system. These systems comprise a ranging system for determining the distance of the object being photographed, and this system in turn moves the focusing mechanism of the objective lens of the camera. The focusing mechanism may be moved by an electric motor, spring motor, electromagnet, or the like. The ranging systems include those which rely on a sonic ranging signal, those which rely on optical triangulation, such as the infrared ranging systems, and those which rely on image contrast analysis to determine best focus. As is apparent to those skilled in the art, focusing by observing an image or images in the viewfinder of a camera, particularly under low light conditions, is a cumbersome and imprecise operation and, thus, cameras having autofocus features are desirable. However, on the other hand, such cameras with autofocus features include, of necessity, the added complication, weight, and power source required for moving the focusing system of the lens to achieve proper focus. In addition, it is particularly difficult to provide the autofocus feature for cameras which use interchangeable lenses because of the substantial differences in sizes, structures, and the like of such lenses, and the consequent difficulty in providing an appropriate focus adjusting system for a variety of lenses or within each lens.

Considering the patent literature, a number of patents exist disclosing automatic camera systems and several patents exist which illustrate electromagnetic systems in cameras such as for locking a diaphragm-actuating device or lever for locking the diaphragm into a position to enable an appropriate exposure to be made. U.S. Pat. No. 3,922,693 shows an arrangement of this nature using an electromagnet which, when energized, locks a diaphragm-actuating lever in an automatic exposure metering system just prior to exposure of the film. U.S. Pat. No. 4,096,493 includes a discussion of various forms of diaphragm scanning mechanisms and exemplary locking devices therefor. This patent describes a system which allows the photographer to override the automatically selected aperture.

With respect to focusing systems, U.S. Pat. No. 4,171,895 discloses a camera focusing system which locks the focus of the camera at infinity, and the locking system is disengageable for manual focusing. U.S. Pat. No. 3,713,371 describes a camera system with an automatic focusing system responsive to a spacial frequency sensing device. In the system described, the system includes means for shifting the lens from a rest position toward a second position and further means for stopping the first means, and hence the movement of the lens at a position of sharp focus. The system uses a cocking mechanism to move the lens to the infinity focus position when film is advanced, and when it is desired to take a photograph, the lens is moved by a spring until the cocking system is stopped by an electromagnet. Honeywell U.S. Pat. No. 3,945,023 describes a camera rangefinding system of the type referred to earlier as the image contrast analysis type system. This system uses a motor to adjust the focus of the lens system. Polaroid U.S. Pat. No. 3,522,764 illustrates a sonic type camera focusing system. Several forms of autofocus systems are discussed in an article entitled "Autofocus: What's It All About?" which appeared in the June 1980 issue of Modern Photography.

SUMMARY OF THE INVENTION

It is an object of the present invention to provide a tactile indicator and control system, particularly for cameras, enlargers and the like.

Another object of this invention is to provide an improved method of tactile indication and control for cameras, enlargers and the like.

A further object of this invention is to provide an improved form of tactile indicator and control system for cameras, enlargers and the like.

Another object of this invention is to provide a form of control system for a camera which involves the operator in the decision-making loop while facilitating the operator's task and reducing the complexity of the camera system.

Another object of this invention is to provide an optical lens with tactile indicator system.

BRIEF DESCRIPTION OF THE DRAWINGS

Other objects, features and advantages of the invention will become apparent from the following description taken in conjunction with the drawings in which:

FIG. 3 is a partial view of an optical lens according to the present invention.

DESCRIPTION OF THE PREFERRED EMBODIMENTS

Figure 2B:
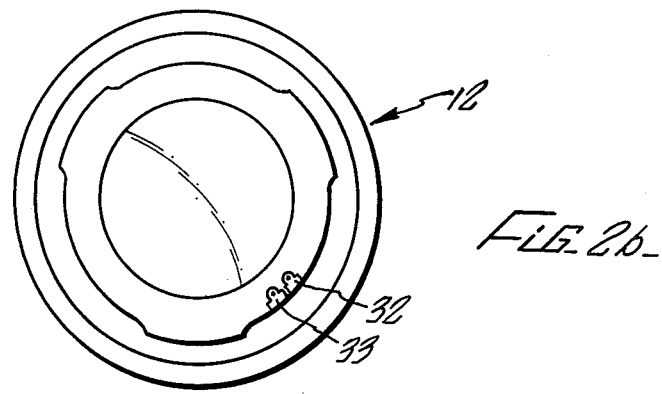
FIG. 2b is a partial view of a lens with electrical contacts.

As noted earlier, the present invention will be described with respect to a photographic film camera of the single-lens reflex type which utilizes interchangeable objective lenses. In the preferred embodiments, the system and method of the present invention utilize a brake, clutch, or similar device to momentarily provide a tactile indication to the camera operator that the proper exposure condition, such as proper focus, proper aperture setting, or proper shutter time setting, has occurred.

In one example, a focusing system of the image contrast measuring type, such as that promoted by Honeywell, is provided in the camera for sensing the occurrence of a proper focus condition. When the proper or best focus condition occurs, the autofocus system provides a signal to an electromagnet which operates a brake to prevent the lens focusing ring from being turned or rotated further, at least momentarily, to thereby provide to the camera operator a tactile indication that the focus condition desired has been achieved. This system can be used instead of or in addition to an indicator or display in the viewfinder of the camera. The electromagnet can be included in the camera body and extend therefrom to engage the focusing ring of the objective lens to thereby brake its rotary action. Alternatively, the objective lens assembly can include the electromagnet therein which, when energized from the autofocus system, at least momentarily stops the focusing ring. In this manner a specific tactile indication is given to the photographer, through his fingers, that the desired focus has been achieved.

The present invention likewise is useful with cameras which employ other types of focus ranging systems, such as the infrared (IR) type and the sonic type. With these forms of systems, generally the camera body includes a sending transducer and a receiving transducer for respectively sending and receiving the ranging signal (infrared or sonic), and the autofocus system determines the appropriate range of the object being photographed. The range is compared with a feedback signal from the objective lens, which feedback signal (be it mechanical or electrical) indicates the range to which the lens is focused at any given time. As the focus of the lens is changed by the camera operator, upon coincidence of the object range and the lens focus range, the electromagnet is energized as in the preceding embodiment to at least momentarily stop movement of the focusing ring to thereby provide the tactile indication to the operator. Stated differently, when the range of the object being photographed is the same as that to which the lens is focused, the tactile indication is provided. In a further embodiment, the infrared or other form of optical ranging system is used, but it is employed to send and receive infrared signals through the camera lens rather than using two separate transducers on the outside of the camera body. In this case, infrared, or a similar wavelength signal, is transmitted through the lens toward the object to be photographed, and the reflected radiation is received back through the lens. The sending and receiving transducers are located in the camera body in the optical path, such as in the pentaprism system much in the same manner as the brightness sensor or sensors are disposed within the camera body. The transmitting transducer may be arranged to send its signal through one part of the lens and the receiving transducer may be arranged to receive the reflected signal through another part of the lens to thereby provide the appropriate triangulation for range computation.

Figure 1:
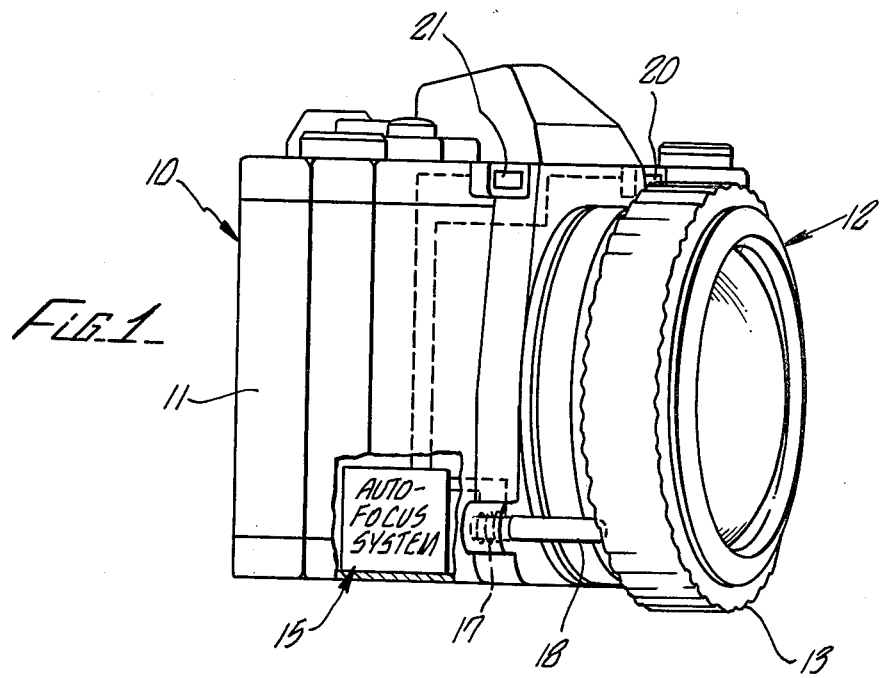
FIG. 1 is a perspective view of an exemplary camera embodying the present invention.

Turning now to the drawings, FIG. 1 illustrates a camera 10 comprising a camera body 11 and an objective lens 12. The objective lens 12 has a focusing ring 13. The camera basically is a conventional single-lens reflex camera, but with modifications which will be further described. While the presently preferred embodiment is described in the environment of a single-lens reflex camera of essentially conventional construction, it will be appreciated that the concepts of the invention can be used with other forms of cameras. The camera 10 also includes an automatic focus system 15 of substantially conventional form. However, it can be a simplified version inasmuch as the autofocus system 15 does not have to drive a motor or electromagnet back and forth in two directions, nor have a servo or follow-up type action for holding the lens focusing element at the focused position by adjusting the same back and forth via a servo action.

The autofocus system 15 used in the present camera need only provide an output signal to energize a solenoid 17 which, in turn, operates a plunger form of brake 18 to momentarily slow or stop rotation of the focusing ring 13 of the objective lens 12. When proper focus is achieved through hand adjustment of the focusing ring 13, the autofocus system 15 provides the signal to energize the solenoid 17, and this causes the plunger 18 to engage a portion or surface, such as the back surface as illustrated, of the focusing ring 13. Alternatively, the solenoid 17 and plunger 18 can be incorporated into the lens assembly 12 to brake the ring 13. In this case a suitable electrical connection is provided between the lens 12 and body 10.

The automatic range finding system used with the autofocus system 15 may be conventional. It may comprise the image contrast analysis type system described previously. In this case, the transducer is arranged in the pentaprism assembly to view the scene being photographed, and provides signals to the autofocus system 15 when the best focus is achieved via manual adjustment of the focusing ring 13 (rather than automatically driving the focusing elements of the lens 12). Alternatively, the rangefinding system may comprise a transmitting transducer 20 and a receiving transducer 21 which are electrically connected with the autofocus system 15. As is known, the transmitting transducer 20 transmits a rangefinding signal to the object to be photographed, the signal is reflected from the object back to the receiving transducer 21 which, in turn, provides an electrical signal to the autofocus system by which the range computation can be made. The system used may rely on sonic or infrared ranging signals as noted above. A feedback signal indicating the focus position of the lens 12 also is provided from the lens to the autofocus system 15 as is described below.

Figure 2A:
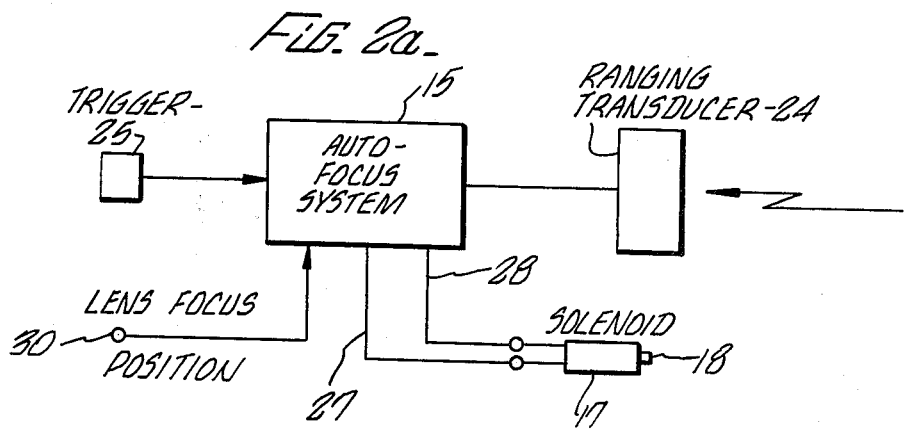
FIG. 2a is a block diagram of the autofocus system used in the camera of FIG. 1.
Figure 9:
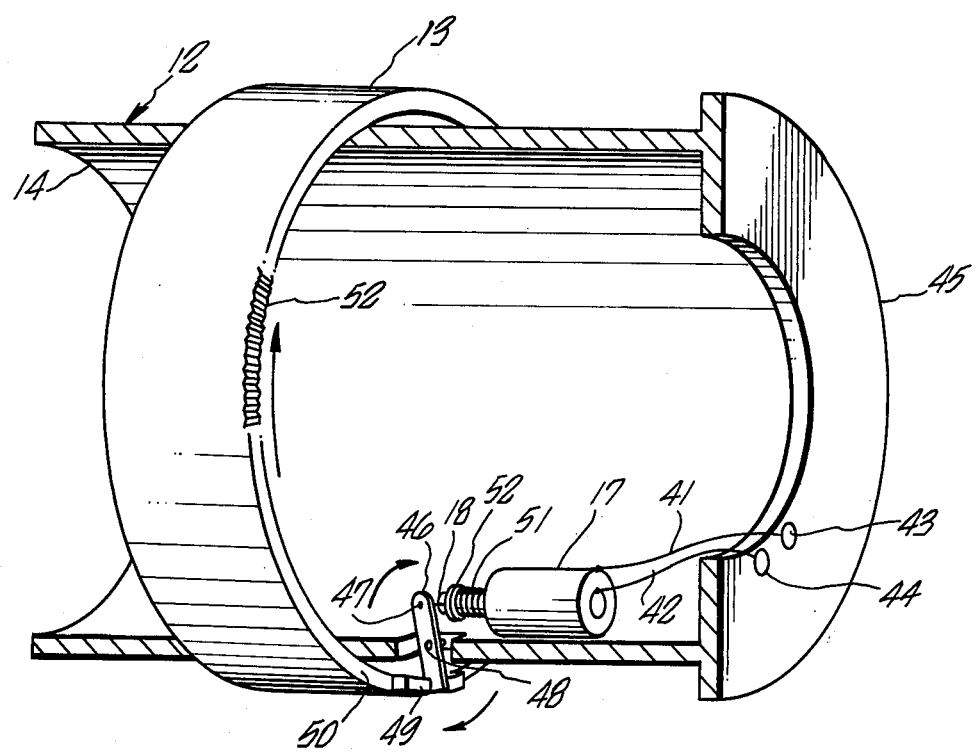

FIG. 2 is a block diagram of the electrical system used in the camera of FIG. 1. The autofocus system 15 is connected to the ranging transducer assembly 24.

This assembly may comprise the image contrast analysis transducer of the previously described Honeywell type, or may comprise the sending and receiving transducers 20-21 discussed above. The autofocus system 15 is turned on via a trigger 25 which in a usual preferred system is a switch responsive to the initial depression of the shutter release button of the camera 10. Typical single-lens reflex cameras include such switches for operating the automatic light metering system thereof, and the same type or a similar switch can be used to turn on the autofocus system 15 and to initiate the ranging operation. In this manner, the autofocus system only requires battery power during the ranging operation.

The output of the autofocus system is a simple two conductor 27-28 electrical output to the solenoid 17. As noted earlier, the solenoid can be disposed within the camera body 11 and the plunger extend therefrom to engage the focusing ring 13 or other focusing mechanism of the objective lens 12. Alternatively, and preferably, the solenoid 17 and plunger 18 are included within the objective lens assembly 12 to brake operation of the focusing ring 13. In this case, the objective lens includes one or more insulated contacts 32-33 as seen in FIG. 2b which mate with corresponding contacts of the camera body so as to provide the energizing signal to the solenoid 17 from the autofocus system 15. Electrical contacts of this nature have been used heretofore for providing signals from an objective lens to a circuit within a single-lens reflex camera body for indicating the position of an adjustable element (e.g., aperture ring) of the objective lens. The contacts 32-33 are similar. In lieu of the braking action provided by the solenoid 17 and plunger 18, a clutching action can be provided instead. In this case, the electromagnet is normally energized upon the taking of a picture to release the focusing ring 13 and allow it to turn, and is de-energized to stop the ring upon occurrence of the proper focus condition.

Furthermore, in systems where the two transducer 20-21 type ranging system is used, a suitable feedback signal indicative of focus position of the lens 12 is needed and is provided to an input terminal 30 for the autofocus system. The feedback signal may be provided through a mechanical linkage from the focusing system of the objective lens 12 or from a potentiometer. The linkage can be like that used to indicate selected aperture from the lens to the camera body system. If a potentiometer is used, it can have a contact which provides a variable signal (e.g., resistance or voltage) as a function of the position of the focusing ring 13. A contact or contacts, like 32-33, can be used to convey this signal to terminal 30 and the camera body system 15. As will be apparent to those skilled in the art, the image contrast analysis type system, which determines the best focus by analyzing the contrast of the viewed image, does not require a feedback signal from the objective lens focusing ring or system.

Turning now to FIG. 3, an exemplary embodiment of a camera lens incorporating the concepts of the present invention is shown. FIG. 3 is a diagrammatic view of a lens 12 having a lens barrel 14. The lens barrel normally has disposed therein (not shown) the various optical elements and mechanical structure for supporting the optical elements. The lens 12 includes a focusing ring 13 which is engageable and operable by the camera operator in a conventional manner. In the embodiment of FIG. 3, the solenoid 17 is disposed within the lens barrel 14, and electrical conductors 41 and 42 connect the winding of the solenoid 17 to respective contacts 43 and 44, similar to the contacts 32-33 of FIG. 2b. These contacts 43 and 44 are disposed in any suitable manner on the rear flange 45 of the lens 12, such as was described and shown with respect to FIG. 2b. The solenoid 17 has a plunger 18 which is connected to an arm 46 by a pin 47. The arm 46 is pivoted at 48 with respect to the lens barrel 14, and the lower end of the arm 46 has disposed thereon a brake shoe 49 which engages a rear surface or brake track 50 of the focusing ring 13. A spring 51 and washer 52 are provided on the plunger 18 to normally bias the arm 46 in a manner to disengage the brake shoe 49 from the surface 50 of the focus ring 13. As will be apparent to those skilled in the art, when the solenoid 17 is energized in the manner previously described, the plunger 18 is retracted thereby pivoting the brake shoe 49 into engagement with the rear surface 50 of the focusing ring 13. Instead of a flat smooth surface 50 for the rear surface of the focusing ring 13, this surface may be serrated or grooved as diagrammatically indicated at 52 in FIG. 3 to increase the stopping torque without requiring additional pressure or power from the solenoid 17. Additionally, the serrated surface 52 can provide a slightly different feel during the focusing action.

While the present system and method are particularly useful for indicating proper focus, they likewise are useful for indicating other proper exposure conditions, such as the proper setting of the aperture or iris diaphragm of the camera lens, or shutter speed ring, as a function of film speed and the brightness level of the scene being photographed. In this case, the brake momentarily stops the movement of the aperture adjustment ring or shutter speed adjustment ring.

In many camera control systems, when the camera operator needs to adjust the camera operating conditions, he frequently has to do so with one hand while looking into the viewing system. Although this has been done for years by camera operators, it is not efficient to rely on an optical display in the viewfinder to indicate the effect or status of such adjustments which are in process. The visual display, which frequently is in the form of a meter needle, LED, or the like, is perceived by many camera users as a distraction and an additional indication to watch, while the natural tendency is to concentrate on the object to be photographed so as to obtain the best composition or photographic effect. Another inconvenience of such visual displays is that the human reaction time between the "okay" indication, "green light," superimposition of split images, or the like, and the reaction of the operator's hand frequently results in a relatively lengthy search involving oscillatory motion, or requires an increase in the "dead zone" of the display to compensate for the lag time. For example, an autofocus system which provides a display (e.g., LED) in the viewfinder (rather than adjusting the lens) has been devised, and it is quite difficult to achieve proper focus because of this reaction time.

The present method and system effectively freezes the motion being performed by the operator through an electromagnet or the like actuating a brake for a fraction of a second or longer once the equivalent of the "okay" or "green light" occurs. This achieves two results. It enhances and corrects the human reaction time, and provides a signal by the "click" or braking action to the operator's hand. This effectively places the "display" (the physical click felt by the hand) closer to where the action is, that is, near the operator's hand which is performing the adjustment.

There are various advantages of the present invention. In most cases, simple examination of the view tells the photographer which way to turn or slide the control being adjusted, and as a result the visual display could actually be totally eliminated. For example, when adjusting aperture or f/stop as a function of brightness level, shutter speed and film sensitivity, the camera operator will feel, through the tactile indication of the present invention, when the aperture ring has been adjusted to the proper f/stop. In the usual case of performing this adjustment the meter, LED, etc., display in the viewfinder would distract the photographer from composing his photograph. Similarly, the sensing device or system of the present invention can be simpler inasmuch as the operator's eyes and brain are part of the feedback loop and usually the operator can readily tell the sign of the error, thereby eliminating the need for the sensing system to have the capability to compute and indicate sign. The present method and system substantially simplifies the present problem of motorization of control, as well as the bulky batteries required for driving a motor, since the operator's brain-hand combination performs most of the physical work, and the electromagnet need operate only for a short time at the critical instant. Also, the present system and method allow the camera operator to feel he is in charge of his camera system and not vice versa, since the stopping action of the electromagnet need only be very temporary and can be overridden readily by the operator for special effects. Furthermore, the present method and system facilitates the provision of autofocusing systems for single-lens reflex cameras inasmuch as a drive system does not have to be provided to the focusing ring, and only a braking or clutching action need be provided, which is simpler to achieve than motorizing the focus system.

While preferred embodiments of the present invention have been described and illustrated, it will be apparent to those skilled in the art that changes can be made therein without departing from the spirit and scope of the present invention.

What is claimed is:

1. A tactile indicator and control system for a camera for providing a tactile indication to the camera operator upon the occurrence of a desired exposure condition comprising
    camera apparatus for forming images of objects to be recorded, said camera apparatus having adjusting means movable over a range of positions by the hand of the operator for varying said exposure condition,
    control system means including sensor means for sensing the exposure condition and providing an electrical signal indicative that a desired state of the exposure condition has occurred, and
    electromechanical means responsive to said electrical signal for physically affecting said adjusting means in a manner to impart to the hand of the operator a tactile indication that the desired exposure condition has occurred.

2. An indicator and control system as in claim 1 wherein
    said exposure condition is focus of the image of the object to be recorded, and the desired state of the exposure condition is proper focus,
    said adjusting means of said camera apparatus comprises focusing ring means of an objective lens assembly for the camera apparatus, and
    said electromechanical means comprises solenoid means responsive to the electrical signal for momentarily stopping movement of the focusing ring means.

3. A tactile indicator and control system as in claim 2 wherein
    said solenoid means is disposed in said objective lens assembly.

4. A tactile indicator and control system as in claim 1 wherein
    said exposure condition is an aperture condition for providing sufficient light for recording by the camera apparatus, said adjusting means of said camera apparatus comprises an aperture adjustment ring of an objective lens of said camera apparatus, and said electromechanical means comrises solenoid means responsive to said electrical signal for momentarily stopping movement of the aperture adjusting means.

5. A tactile indicator and control system as in claim 1 wherein
    said camera apparatus comprises a video camera, and the desired exposure condition is focus of the image of the object being photographed, said adjusting means comprises lens focusing means for the camera apparatus, and said electromechanical means comprises solenoid means for momentarily stopping movement of said focusing means.

6. A tactile indicator and control system as in claim 1 wherein
    said camera apparatus comprises a photographic enlarger, and the desired exposure condition is focus of an image, said adjusting means comprises lens focusing means for the camera apparatus, and said electromechanical means comprises solenoid means for momentarily stopping movement of said focusing means.

7. A tactile indicator and control system for photographic camera for providing a tactile indication to the camera operator upon the occurrence of a desired focus condition comprising
    camera apparatus for focusing and recording images of objects to be photographed, said camera apparatus having a lens with focus adjusting means movable over a range of positions by the hand of the operator for varying the focus of the lens,
    control system means including sensor means for sensing the focus and providing an electrical signal indicative that a desired focus condition has occurred, and
    electromechanical means responsive to said electrical signal for physically affecting said focus adjusting means in a manner to impart to the hand of the operator a tactile indication that the desired photographic exposure condition has occurred, said electromechanical means comprising solenoid means responsive to the electrical signal for momentarily stopping movement of the focus adjusting means.

8. A method of providing a tactile indication to the operator of a camera upon the occurrence of a desired exposure condition and wherein the camera has a lens for forming images of objects to be recorded and includes adjusting means movable over a range of positions by the hand of the operator for varying said exposure condition, the improvement comprising sensing the exposure condition and providing an electrical signal indicative that a desired state of the exposure condition has occurred, and momentarily stopping movement of the adjusting means in response to said electrical signal to impart to the hand of the camera operator a tactile indication that the desired exposure condition has occurred.

9. A method as in claim 8, wherein said exposure condition is focus of the image of an object to be recorded, the desired state of the exposure condition is proper focus, and said adjusting means comprises focusing means of an objective lens assembly for the camera.

10. An objective lens for a camera comprising, lens barrel means for containing optical elements and mechanical support elements of the objective lens, adjusting means coupled with respect to the barrel means to be movable over a range of positions by the hand of an operator of the lens for varying an exposure condition, and electromechanical means coupled with respect to the lens barrel means and the adjusting means and responsive to an electrical signal which is indicative that a desired state of the exposure condition has occurred for physically affecting said adjusting means to impart to the hand of the operator a tactile indication that the desired exposure condition has occurred.

11. An objective lens as in claim 10 wherein said exposure condition is focus of an image of an object to be recorded, the desired state of the exposure condition is proper focus, and said adjusting means comprising focusing means of the objective lens.

12. A tactile indicator and control system for a camera for providing a tactile indication to the camera operator upon the occurrence of a desired focus condition comprising camera apparatus for recording images of objects to be photographed, said camera apparatus having focus means movable over a range of positions by the hand of the operator for varying said focus condition, control system means including sensor means for determining the focus condition and providing an electrical signal indicative that a desired focus condition has occurred, and actuator means for enabling said control system means during operation of said camera apparatus, and electromechanical means responsive to said electrical signal for momentarily stopping movement of said adjusting means to impart to the hand of the operator a tactile indication that the desired focus condition has occurred.

13. A tactile indicator and control system for a camera for providing a tactile indication to the camera operator upon the occurrence of a predetermined exposure condition comprising:

camera apparatus for forming images of objects to be recorded, said camera apparatus having adjusting means movable over a range of positions by the hand of the operator for varying said exposure condition, control system means including sensor means for sensing the exposure condition and providing an electrical signal indicative that a predetermined state of the exposure condition has occurred, and electromechanical means responsive to said electrical signal for physically affecting said adjusting means in a manner to impart to the hand of the operator a tactile indication that the predetermined exposure condition has occurred.

14. An indicator and control system as in claim 13 wherein said exposure condition is focus of the image of the object to be recorded, and the predetermined state of the exposure condition is focus, said adjusting means of said camera apparatus comprises focusing ring means of an objective lens assembly for the camera apparatus, and said electromechanical means comprises solenoid means responsive to the electical signal for momentarily stopping movement of the focusing ring means.

* * * * *